United States Patent
He et al.

(10) Patent No.: US 12,335,015 B2
(45) Date of Patent: Jun. 17, 2025

(54) DECODING BROADCAST CHANNEL SIGNALING USING MULTIPLE BEAMS

(71) Applicant: QUALCOMM Incorporated, San Diego, CA (US)

(72) Inventors: Ruhua He, San Diego, CA (US); Kang Gao, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/359,196

(22) Filed: Jul. 26, 2023

(65) Prior Publication Data
US 2025/0038827 A1    Jan. 30, 2025

(51) Int. Cl.
*H04B 7/08*    (2006.01)

(52) U.S. Cl.
CPC ......... *H04B 7/0857* (2013.01); *H04B 7/0888* (2013.01)

(58) Field of Classification Search
CPC ...... H04B 7/08; H04B 7/0837; H04B 7/0842; H04B 7/0848; H04B 7/0857; H04B 7/0865; H04B 7/0868; H04B 7/0874; H04B 7/088; H04B 7/0882; H04B 7/0888
See application file for complete search history.

(56) References Cited

U.S. PATENT DOCUMENTS

| | | | | |
|---|---|---|---|---|
| 10,965,360 B2* | 3/2021 | Schenk | ............... | H03M 13/612 |
| 11,147,043 B2* | 10/2021 | Wei | ..................... | H04W 72/30 |
| 11,444,681 B2* | 9/2022 | Jung | ................... | H03M 13/6306 |
| 11,564,217 B2* | 1/2023 | Kim | ..................... | H04L 5/0094 |
| 11,576,061 B2* | 2/2023 | Dallal | ................. | H04B 17/336 |
| 11,647,530 B2* | 5/2023 | Landis | ................. | H04B 7/088 370/329 |
| 11,870,469 B2* | 1/2024 | Jung | ..................... | H04W 72/53 |
| 2012/0121034 A1* | 5/2012 | Murakami | ............ | H04L 1/0003 375/295 |
| 2017/0064764 A1* | 3/2017 | Ke | ......................... | H04W 48/12 |
| 2018/0198560 A1* | 7/2018 | Jiang | .................... | H04L 1/0064 |
| 2018/0331802 A1* | 11/2018 | Bhattad | ............. | H04W 36/0005 |
| 2019/0068270 A1* | 2/2019 | Schenk | ................. | H04B 7/088 |
| 2020/0014448 A1* | 1/2020 | Osawa | .................. | H04B 7/088 |
| 2020/0260416 A1* | 8/2020 | Kim | ..................... | H04B 7/088 |
| 2021/0058135 A1* | 2/2021 | Jung | .................... | H04W 72/53 |

(Continued)

OTHER PUBLICATIONS

International Search Report and Written Opinion—PCT/US2024/036327—ISA/EPO—Oct. 22, 2024.

*Primary Examiner* — James M Perez
(74) *Attorney, Agent, or Firm* — Kevin M. Donnelly; Holland & Hart LLP

(57) ABSTRACT

Methods, systems, and devices for wireless communication are described. A user equipment (UE) may measure a signal strength for each beam of a set of multiple beams. The UE may select, from the set of multiple beams, a set of two or more beams each having a respective signal strength satisfying a threshold. The UE may attempt to decode a first broadcast channel signal of a first beam of the set of two or more beams in a single broadcast channel period. The UE may decode, after failing to decode the first broadcast channel signal of the first beam, a second broadcast channel signal of a second beam of the set of two or more beams in the single broadcast channel period.

20 Claims, 9 Drawing Sheets

(56) References Cited

U.S. PATENT DOCUMENTS

| | | | |
|---|---|---|---|
| 2022/0116801 A1* | 4/2022 | Dallal | H04B 17/336 |
| 2022/0201695 A1* | 6/2022 | Landis | H04B 7/063 |
| 2023/0032356 A1* | 2/2023 | Yan | H04B 7/0695 |
| 2023/0041620 A1* | 2/2023 | Jung | H03M 13/3769 |
| 2023/0276485 A1* | 8/2023 | Landis | H04W 72/542 |
| | | | 370/329 |
| 2023/0344497 A1* | 10/2023 | Wang | H04B 7/0639 |
| 2023/0388815 A1* | 11/2023 | Jeon | H04B 17/336 |
| 2025/0038827 A1* | 1/2025 | He | H04B 7/06952 |

* cited by examiner

DECODING BROADCAST CHANNEL SIGNALING USING MULTIPLE BEAMS

TECHNICAL FIELD

The following relates to wireless communication, including decoding broadcast channel signaling using multiple beams.

DESCRIPTION OF THE RELATED TECHNOLOGY

Wireless communication systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communication system may include one or more base stations, each supporting wireless communication for communication devices, which may be known as user equipment (UE).

Some wireless communication systems may support broadcast channel signaling. For instance, a network entity of the wireless communication system may transmit a broadcast channel signal using each beam of multiple beams from the network entity, and each broadcast channel signal on each of the beams may have a same payload. Examples of broadcast channel signals may include paging signaling and system information, such as a system information block (SIB), among others. A UE may measure beam strength and select a best beam of the multiple beams to use to decode the broadcast channel signaling. For example, the UE may monitor for a broadcast channel signal on the best beam of the multiple beams and attempt to decode the broadcast channel signal on the best beam. However, in some cases, the UE may not be able to efficiently nor effectively decode the broadcast channel signal on the best beam and must wait until a next instance of the broadcast channel signal on the strongest beam during a following broadcast channel period.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication by a user equipment (UE). The method includes measuring a signal strength for each beam of a set of multiple beams, selecting, from the set of multiple beams, a set of two or more beams each having a respective signal strength satisfying a threshold, attempting to decode a first broadcast channel signal of a first beam of the set of two or more beams in a single broadcast channel period, and decoding, after failing to decode the first broadcast channel signal of the first beam, a second broadcast channel signal of a second beam of the set of two or more beams in the single broadcast channel period.

Another innovative aspect of the subject matter described in this disclosure can be implemented in a UE for wireless communication. The UE includes a processing system that includes processor circuitry and memory circuitry that stores code. The processing system may be configured to cause the UE to measure a signal strength for each beam of a set of multiple beams, select, from the set of multiple beams, a set of two or more beams each having a respective signal strength satisfying a threshold, attempt to decode a first broadcast channel signal of a first beam of the set of two or more beams in a single broadcast channel period, and decode, after failing to decode the first broadcast channel signal of the first beam, a second broadcast channel signal of a second beam of the set of two or more beams in the single broadcast channel period.

Another innovative aspect of the subject matter described in this disclosure can be implemented in an apparatus for wireless communication at a UE. The apparatus includes means for measuring a signal strength for each beam of a set of multiple beams, means for selecting, from the set of multiple beams, a set of two or more beams each having a respective signal strength satisfying a threshold, means for attempting to decode a first broadcast channel signal of a first beam of the set of two or more beams in a single broadcast channel period, and means for decoding, after failing to decode the first broadcast channel signal of the first beam, a second broadcast channel signal of a second beam of the set of two or more beams in the single broadcast channel period.

Another innovative aspect of the subject matter described in this disclosure can be implemented in a non-transitory computer-readable medium storing code for wireless communications at a UE. The code includes instructions executable by at least one processor to measure a signal strength for each beam of a set of multiple beams, select, from the set of multiple beams, a set of two or more beams each having a respective signal strength satisfying a threshold, attempt to decode a first broadcast channel signal of a first beam of the set of two or more beams in a single broadcast channel period, and decode, after failing to decode the first broadcast channel signal of the first beam, a second broadcast channel signal of a second beam of the set of two or more beams in the single broadcast channel period.

In some examples of the method, UEs, apparatuses, and non-transitory computer-readable medium described herein, decoding the second broadcast channel signal may include operations, features, means, or instructions for decoding the second broadcast channel signal in accordance with a composite log-likelihood ratio for a set of multiple broadcast channel signals including the second broadcast channel signal and including one or more previous broadcast channel signals received in the single broadcast channel period including the first broadcast channel signal.

In some examples of the method, UEs, apparatuses, and non-transitory computer-readable medium described herein, decoding the second broadcast channel signal may include operations, features, means, or instructions for decoding the second broadcast channel signal after an attempt to decode the first broadcast channel signal, where a reception of the second broadcast channel signal may be temporally after a reception of the first broadcast channel signal.

DETAILED DESCRIPTION

Figure 1:
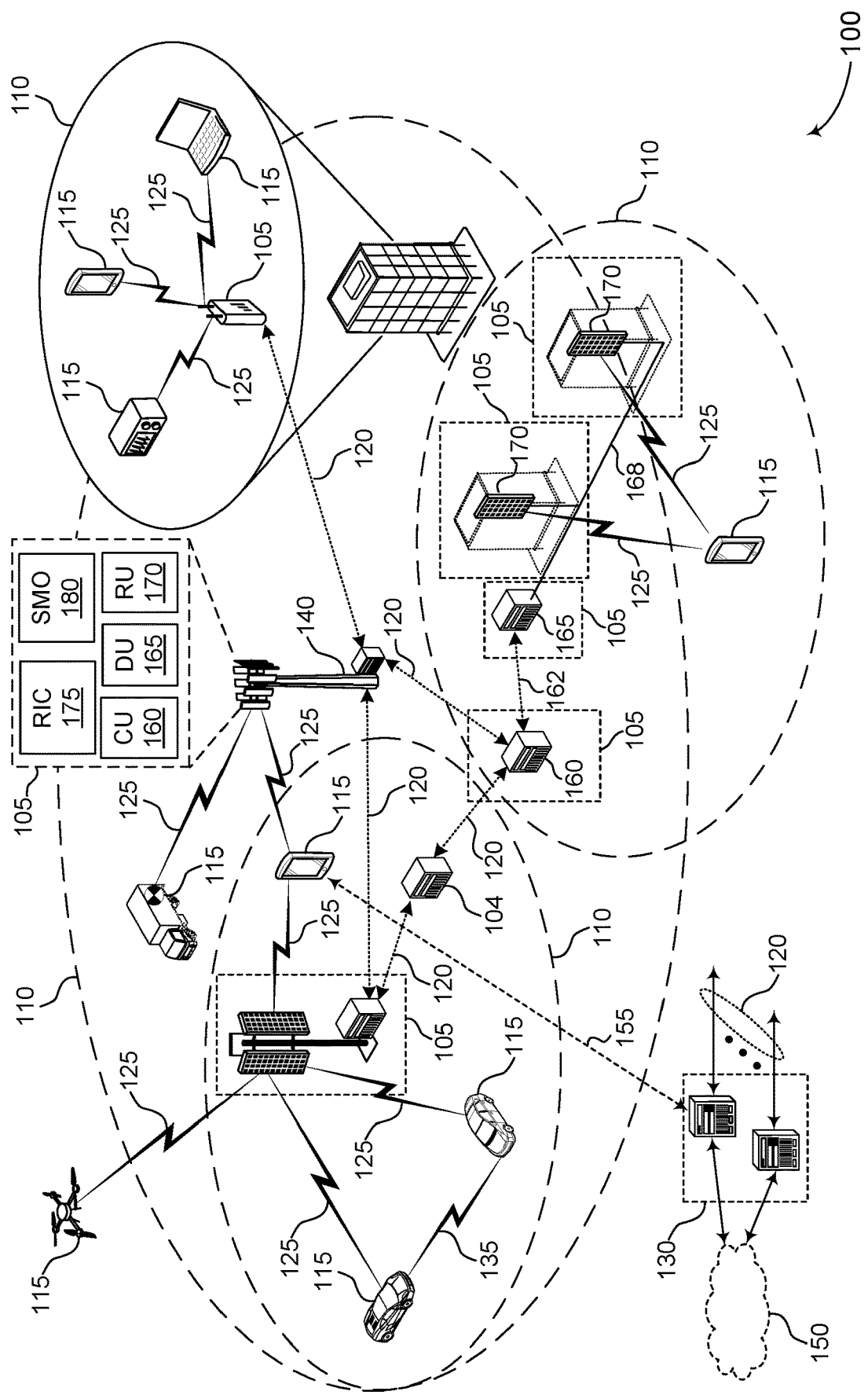
FIG. 1 shows an example of a wireless communication system that supports decoding broadcast channel signaling using multiple beams in accordance with one or more aspects of the present disclosure.

Some wireless communication systems may support broadcast channel signaling. For instance, a network entity may transmit a broadcast channel signal using each beam of multiple beams from the network entity, and each broadcast channel signal on each of the beams may have a same payload. Examples of broadcast channel signals may include paging signaling and system information, such as a system information block (SIB), among others. A user equipment (UE) may measure beam strength and/or other parameters, such as during a beam training procedure, and select a best beam of the multiple beams (for example, a strongest beam or a highest quality beam) to use to decode the broadcast channel signaling. In examples in which the UE does not decode successfully the broadcast channel signal on the best beam, however, the UE may wait until a next instance of the broadcast channel signal on the strongest beam during a following broadcast channel period.

Various aspects generally relate to broadcast channel signaling in wireless communication, and more specifically, to decoding a broadcast channel signal that is transmitted on multiple beams within a single broadcast channel period. A UE may select a set of multiple beams to use to decode the broadcast channel signal. For example, the UE may select a top two or more beams based on signal strength, or signal quality, or both. The UE may attempt to decode a first broadcast channel signal of a first beam of the set of beams. In examples in which the attempt to decode the first broadcast channel signal is unsuccessful, the UE may attempt to decode a second broadcast channel signal of a second beam of the set of beams. The first broadcast channel signal and the second broadcast channel signal may have a payload (for example, a same payload) and be transmitted within a single broadcast channel period. In some examples, the UE may store information, such as a log-likelihood ratio (LLR), obtained by attempting to decode the first broadcast channel signal. The UE may decode the second broadcast channel signal based on the stored information, such as the stored LLR. The UE may store additional information, such as additional LLRs, for additional unsuccessful decoding attempts to generate an accumulated LLR, which may be based on the stored LLR and/or the additional LLRs. The UE may then attempt to decode the accumulated LLR to obtain the payload of the broadcast channel signal.

Particular aspects of the subject matter described in this disclosure may be implemented to realize one or more of the following potential advantages. The techniques employed by the described communication devices may reduce power consumption, increase reliability, reduce latency, and yield efficient decoding performance. For example, attempting to decode multiple broadcast channel signals in a single broadcast channel period may increase a likelihood of successfully decoding a broadcast channel signal during the single broadcast channel period by providing additional decoding opportunities associated with multiple broadcast channel signals. In some examples, broadcast channel signaling may be transmitted with low signal-to-interference plus noise (SINR) characteristics, and the additional decoding attempts may increase a likelihood of successfully decoding the broadcast channel signaling even with low SINR characteristics. By increasing the likelihood of decoding the broadcast channel signal in a single broadcast channel period, the UE may reduce a quantity of wake up procedures needed over separate broadcast channel periods compared to decoding the broadcast channel signal in the separate broadcast channel periods, which limits the energy the UE may otherwise spend for additional wake up procedures. In some examples, latency may be reduced based on the UE not waiting until a subsequent broadcast channel period to receive the information of the broadcast channel signal. For some implementations, such as operations using Frequency Range 2, the UE may perform more frequent beam training procedures to determine a best beam from the network entity (compared to operations in other frequency ranges). By improving performance of broadcast channel signaling and increasing a likelihood of decoding the broadcast channel signal within a single broadcast channel period, the UE may perform fewer beam training procedures and spend less energy waking up for beam training procedures, reducing power consumption.

Aspects of the disclosure are initially described in the context of wireless communication systems. Aspects of the disclosure are further illustrated and described with reference to a process flow. Aspects of the disclosure are further illustrated by and described with reference to apparatus diagrams, system diagrams, and flowcharts that relate to decoding broadcast channel signaling using multiple beams.

FIG. 1 shows an example of a wireless communication system 100 that supports decoding broadcast channel signaling using multiple beams in accordance with one or more aspects of the present disclosure. The wireless communication system 100 may include one or more network entities 105, one or more UEs 115, and a core network 130. In some examples, the wireless communication system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communication system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (for example, a radio frequency (RF) access link). For example, a network entity 105 may support a coverage area 110 (for example, a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communication system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communication with various types of devices, such as other UEs 115 or network entities 105, as shown in FIG. 1.

As described herein, a node of the wireless communication system 100, which may be referred to as a network node, or a wireless node, may be a network entity 105 (for example, any network entity described herein), a UE 115 (for example, any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (for example, in accordance with an S1, N2, N3, or other interface protocol). In some examples, network entities 105 may communicate with one another via a backhaul communication link 120 (for example, in accordance with an X2, Xn, or other interface protocol) either directly (for example, directly between network entities 105) or indirectly (for example, via a core network 130). In some examples, network entities 105 may communicate with one another via a midhaul communication link 162 (for example, in accordance with a midhaul interface protocol) or a fronthaul communication link 168 (for example, in accordance with a fronthaul interface protocol), or any combination thereof. The backhaul communication links 120, midhaul communication links 162, or fronthaul communication links 168 may be or include one or more wired links (for example, an electrical link, an optical fiber link), one or more wireless links (for example, a radio link, a wireless optical link), among other examples or various combinations thereof. A UE 115 may communicate with the core network 130 via a communication link 155.

One or more of the network entities 105 described herein may include or may be referred to as a base station 140 (for example, a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (for example, a base station 140) may be implemented in an aggregated (for example, monolithic, standalone) base station architecture, which may be configured to utilize a protocol stack that is physically or logically integrated within a single network entity 105 (for example, a single RAN node, such as a base station 140).

In some examples, a network entity 105 may be implemented in a disaggregated architecture (for example, a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (for example, a network configuration sponsored by the O-RAN Alliance), or a virtualized RAN (vRAN) (for example, a cloud RAN (C-RAN)). For example, a network entity 105 may include one or more of a central unit (CU) 160, a distributed unit (DU) 165, a radio unit (RU) 170, a RAN Intelligent Controller (RIC) 175 (for example, a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (for example, separate physical locations). In some examples, one or more network entities 105 of a disaggregated RAN architecture may be implemented as virtual units (for example, a virtual CU (VCU), a virtual DU (VDU), a virtual RU (VRU)).

The split of functionality between a CU 160, a DU 165, and an RU 170 is flexible and may support different functionalities depending on which functions (for example, network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (for example, layer 3 (L3), layer 2 (L2)) functionality and signaling (for example, Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (for example, physical (PHY) layer) or L2 (for example, radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (for example, via one or more RUs 170). In some examples, a functional split between a CU 160 and a DU 165, or between a DU 165 and an RU 170 may be within a protocol layer (for example, some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (for example, F1, F1-c. F1-u), and a DU 165 may be connected to one or more RUs 170 via a fronthaul communication link 168 (for example, open fronthaul (FH) interface). In some examples, a midhaul communication link 162 or a fronthaul communication link 168 may be implemented in accordance with an interface (for example, a channel) between layers of a protocol stack supported by respective network entities 105 that are in communication via such communication links.

In wireless communication systems (for example, wireless communication system 100), infrastructure and spectral resources for radio access may support wireless backhaul link capabilities to supplement wired backhaul connections, providing an IAB network architecture (for example, to a core network 130). In some examples, in an IAB network, one or more network entities 105 (for example, IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (for example, a donor base station 140). The one or more donor network entities 105 (for example, IAB donors) may be in communication with one or more additional network entities 105 (for example, IAB nodes 104) via supported access and backhaul links (for example, backhaul communication links 120). IAB nodes 104 may include an IAB mobile termination (IAB-MT) controlled (for example, scheduled) by DUs 165 of a coupled IAB donor. An IAB-MT may include an independent set of antennas for relay of communication with UEs 115, or may share the same antennas (for example, of an RU 170) of an IAB node 104 used for access via the DU 165 of the IAB node 104 (for example, referred to as virtual IAB-MT (vIAB-MT)). In some examples, the IAB nodes 104 may include DUs 165 that support communication links with additional entities (for example, IAB nodes 104, UEs 115) within the relay chain or configuration of the access network (for example, downstream). In such cases, one or more components of the disaggregated RAN architecture (for example, one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support decoding broadcast channel signaling using multiple beams as described herein. For example, some operations described as being performed by a UE 115 or a network entity 105 (for example, a base station 140) may additionally, or alternatively, be performed by one or more components of the disaggregated RAN architecture (for example, IAB nodes 104, DUs 165, CUs 160, RUS 170, RIC 175, SMO 180).

A UE 115 may include or may be referred to as a mobile device, a wireless communication device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communication (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (for example, an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (for example, entity, sub-entity) of a network entity 105. For example, the terms "transmitting," "receiving," or "communicating," when referring to a network entity 105, may refer to any portion of a network entity 105 (for example, a base station 140, a CU 160, a DU 165, a RU 170) of a RAN communicating with another device (for example, directly or via one or more other network entities 105).

In some examples, such as in a carrier aggregation configuration, a carrier may also have acquisition signaling or control signaling that coordinates operations for other carriers. A carrier may be associated with a frequency channel (for example, an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (for example, of the same or a different radio access technology).

The communication links 125 shown in the wireless communication system 100 may include downlink transmissions (for example, forward link transmissions) from a network entity 105 to a UE 115, uplink transmissions (for example, return link transmissions) from a UE 115 to a network entity 105, or both, among other configurations of transmissions. Carriers may carry downlink or uplink communication (for example, in an FDD mode) or may be configured to carry downlink and uplink communication (for example, in a TDD mode).

A carrier may be associated with a particular bandwidth of the RF spectrum and, in some examples, the carrier bandwidth may be referred to as a "system bandwidth" of the carrier or the wireless communication system 100. For example, the carrier bandwidth may be one of a set of bandwidths for carriers of a particular radio access technology (for example, 1.4, 3, 5, 10, 15, 20, 40, or 80 megahertz (MHz)). Devices of the wireless communication system 100 (for example, the network entities 105, the UEs 115, or both) may have hardware configurations that support communication using a particular carrier bandwidth or may be configurable to support communication using one of a set of carrier bandwidths. In some examples, the wireless communication system 100 may include network entities 105 or UEs 115 that support concurrent communication using carriers associated with multiple carrier bandwidths. In some examples, each served UE 115 may be configured for operating using portions (for example, a sub-band, a BWP) or all of a carrier bandwidth.

Signal waveforms transmitted via a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (for example, a duration of one modulation symbol) and one subcarrier, in which case the symbol period and subcarrier spacing may be inversely related. The quantity of bits carried by each resource element may depend on the modulation scheme (for example, the order of the modulation scheme, the coding rate of the modulation scheme, or both), such that a relatively higher quantity of resource elements (for example, in a transmission duration) and a relatively higher order of a modulation scheme may correspond to a relatively higher rate of communication. A wireless communication resource may refer to a combination of an RF spectrum resource, a time resource, and a spatial resource (for example, a spatial layer, a beam), and the use of multiple spatial resources may increase the data rate or data integrity for communication with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communication for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communication resource may be organized according to radio frames each having a specified duration (for example, 10 milliseconds (ms)). Each radio frame may be identified by a system frame number (SFN) (for example, ranging from 0 to 1023).

Each frame may include multiple consecutively-numbered subframes or slots, and each subframe or slot may have the same duration. In some examples, a frame may be divided (for example, in the time domain) into subframes, and each subframe may be further divided into a quantity of slots. Alternatively, each frame may include a variable quantity of slots, and the quantity of slots may depend on subcarrier spacing. Each slot may include a quantity of symbol periods (for example, depending on the length of the cyclic prefix prepended to each symbol period). In some wireless communication systems 100, a slot may further be divided into multiple mini-slots associated with one or more symbols. Excluding the cyclic prefix, each symbol period may be associated with one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communication system 100 and may be referred to as a transmission time interval (TTI). In some examples, the TTI duration (for example, a quantity of symbol periods in a TTI) may be variable. Additionally, or alternatively, the smallest scheduling unit of the wireless communication system 100 may be dynamically selected (for example, in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a set of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (for example, using a carrier) and may be associated with an identifier for distinguishing neighboring cells (for example, a physical cell identifier (PCID), a virtual cell identifier (VCID), or others). In some examples, a cell also may refer to a coverage area 110 or a portion of a coverage area 110 (for example, a sector) over which the logical communication entity operates. Such cells may range from smaller areas (for example, a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (for example, a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communication system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a network entity 105 (for example, a base station 140) without human intervention. In some examples, M2M communication or MTC may include communication from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communication (for example, a mode that supports one-way communication via transmission or reception, but not transmission and reception concurrently). In some examples, half-duplex communication may be performed at a reduced peak rate. Other power conservation techniques for the UEs 115 include entering a power saving deep sleep mode when not engaging in active communication, operating using a limited bandwidth (for example, according to narrowband communication), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communication system 100 may be configured to support ultra-reliable communication or low-latency communication, or various combinations thereof. For example, the wireless communication system 100 may be configured to support ultra-reliable low-latency communication (URLLC). The UEs 115 may be designed to support ultra-reliable, low-latency, or critical functions. Ultra-reliable communication may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (for example, in accordance with a peer-to-peer (P2P), D2D, or sidelink protocol). In some examples, one or more UEs 115 of a group that are performing D2D communication may be within the coverage area 110 of a network entity 105 (for example, a base station 140, an RU 170), which may support aspects of such D2D communication being configured by (for example, scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communication may support a one-to-many (1:M) system in which each UE 115 transmits to each of the other UEs 115 in the group. In some examples, a network entity 105 may facilitate the scheduling of resources for D2D communication. In some other examples, D2D communication may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (for example, base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communication system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communication using UHF waves may be associated with smaller antennas and shorter ranges (for example, less than 100 kilometers) compared to communication using the smaller frequencies and longer waves of the high frequency (HF) or very high frequency (VHF) portion of the spectrum below 300 MHz.

The wireless communication system 100 may also operate using a super high frequency (SHF) region, which may be in the range of 3 GHz to 30 GHz, also known as the centimeter band, or using an extremely high frequency (EHF) region of the spectrum (for example, from 30 GHz to 300 GHz), also known as the millimeter band. In some examples, the wireless communication system 100 may support millimeter wave (mmW) communication between the UEs 115 and the network entities 105 (for example, base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed RF spectrum bands. For example, the wireless communication system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (for example, LAA). Operations using unlicensed spectrum may include downlink transmissions, uplink transmissions, P2P transmissions, or D2D transmissions, among other examples.

A network entity 105 (for example, a base station 140, an RU 170) or a UE 115 may be equipped with multiple antennas, which may be used to employ techniques such as transmit diversity, receive diversity, multiple-input multiple-output (MIMO) communication, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communication with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (for example, a network entity 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A network entity 105 or a UE 115 may use beam sweeping techniques as part of beamforming operations. For example, a network entity 105 (for example, a base station 140, an RU 170) may use multiple antennas or antenna arrays (for example, antenna panels) to conduct beamforming operations for directional communication with a UE 115. Some signals (for example, synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (for example, by a transmitting device, such as a network entity 105, or by a receiving device, such as a UE 115) a beam direction for later transmission or reception by the network entity 105.

Some signals, such as data signals associated with a particular receiving device, may be transmitted by transmitting device (for example, a transmitting network entity 105, a transmitting UE 115) along a single beam direction (for example, a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (for example, by a network entity 105 or a UE 115) may be performed using multiple beam directions, and the device may use a combination of digital precoding or beamforming to generate a combined beam for transmission (for example, from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted along one or more directions by a network entity 105 (for example, a base station 140, an RU 170), a UE 115 may employ similar techniques for transmitting signals multiple times along different directions (for example, for identifying a beam direction for subsequent transmission or reception by the UE 115) or for transmitting a signal along a single direction (for example, for transmitting data to a receiving device).

A receiving device (for example, a UE 115) may perform reception operations in accordance with multiple receive configurations (for example, directional listening) when receiving various signals from a transmitting device (for example, a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned along a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communication at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (for example, a communication link 125, a D2D communication link 135). HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some wireless communication systems, a network entity 105 may transmit signaling using a broadcast channel. Paging signaling and system information, such as a SIB, may be examples of broadcast channel signals. The network entity 105 may transmit a broadcast channel signal on all beams of the network entity 105, and each broadcast channel signal on all of the beams may have a same payload. For example, a first broadcast channel signal transmitted using a first beam may have a same payload or carry the same information as a second broadcast channel signal transmitted using a second beam.

A UE 115 may receive signals from the network entity 105 to perform a beam training procedure and select a best beam from the network entity 105. For example, the UE 115 may measure reference signals and/or synchronization signal blocks (SSBs) to determine a strongest downlink beam for the UE 115 from the network entity 105. In some examples, the UE 115 may wake up to measure these signals to track a best beam from the network entity 105. For example, a UE 115 operating in Frequency Range 2 may perform frequent beam training procedures to determine or track a best beam from the network entity 105, including waking up to measure signals from the network entity 105. In some examples, the best beam may correspond to a beam with a highest reference signal received power (RSRP) measurement and/or a highest signal-to-interference plus noise (SINR) measurement.

In some wireless communication systems, the UE 115 may monitor for a broadcast channel signal that is transmitted using the best beam. For example, in examples in which the UE 115 determines beam 4 as the best beam from the network entity 105, the UE 115 may attempt to decode a broadcast channel signal that is transmitted using beam 4. In examples in which the UE 115 does not successfully decode the broadcast channel signal, the UE 115 may wait until a next broadcast channel cycle and attempt to decode the broadcast channel signal using the best beam again. In some examples, the UE 115 may perform additional beam training between monitoring occasions of the broadcast channel signal or decoding attempts to track the best beam from the network entity 105. For example, the best beam for the next broadcast channel cycle may be beam 4, or the best beam may have changed to a different beam based on the additional beam training.

Techniques described herein may allow for a UE 115 to decode broadcast channel signal that is transmitted on multiple beams within a single broadcast channel period. The UE 115 may select a set of multiple beams to use to decode the broadcast channel signal. For example, the UE 115 may select a top two beams based on RSRP measurements and/or SINR measurements. In some examples, the UE 115 may obtain the RSRP measurements and/or SINR measurements during a beam training procedure.

The UE 115 may attempt to decode a first broadcast channel signal of a first beam of the set of beams. In examples in which the attempt to decode the first broadcast channel signal is unsuccessful, the UE 115 may attempt to decode a second broadcast channel signal of a second beam of the set of beams. The first broadcast channel signal and the second broadcast channel signal may have a same payload and be transmitted within a single broadcast channel period. The UE 115 may have a higher likelihood of decoding the broadcast channel signal within a single broadcast channel period by attempting to decode multiple broadcast channel signals transmitted using different beams. If the UE 115 obtains the broadcast channel signal information within a single broadcast channel period, the UE 115 may consume less energy, as the UE 115 may not perform additional wakeup procedures in later broadcast channel periods. The increased reliability of receiving the broadcast channel signal information within a single broadcast channel period may reduce latency in broadcast channel signaling, as the UE 115 may not wait until a following broadcast channel period to decode the broadcast channel signal. In some examples, the UE 115 may spend less energy by performing fewer wake up procedures for beam management or tracking a best beam of the network entity 105, which may result in significant power savings especially while operating in Frequency Range 2.

In some examples, the UE 115 may store LLRs of unsuccessful decoding attempts. For example, the UE 115 may store an LLR obtained by attempting to decode the first broadcast channel signal. In some examples, the UE 115 may attempt to decode the second broadcast channel signal based on the stored LLR. For example, the UE 115 may store the LLR of the first decoding attempt (e.g., of the first broadcast channel signal) and upon receiving the second broadcast channel signal, the UE 115 may attempt to decode after combining the LLR of the second broadcast channel signal with the LLR of the first broadcast channel signal. In some examples, the UE 115 may store additional LLRs for unsuccessful decoding attempts to generate an accumulated LLR. In some examples, the UE 115 may fail to decode the second broadcast channel signal and generate an accumulated LLR from an LLR for the first decoding attempt and an LLR from the second decoding attempt. The UE 115 may decode the accumulated LLR to obtain the broadcast channel signal information.

Figure 2:
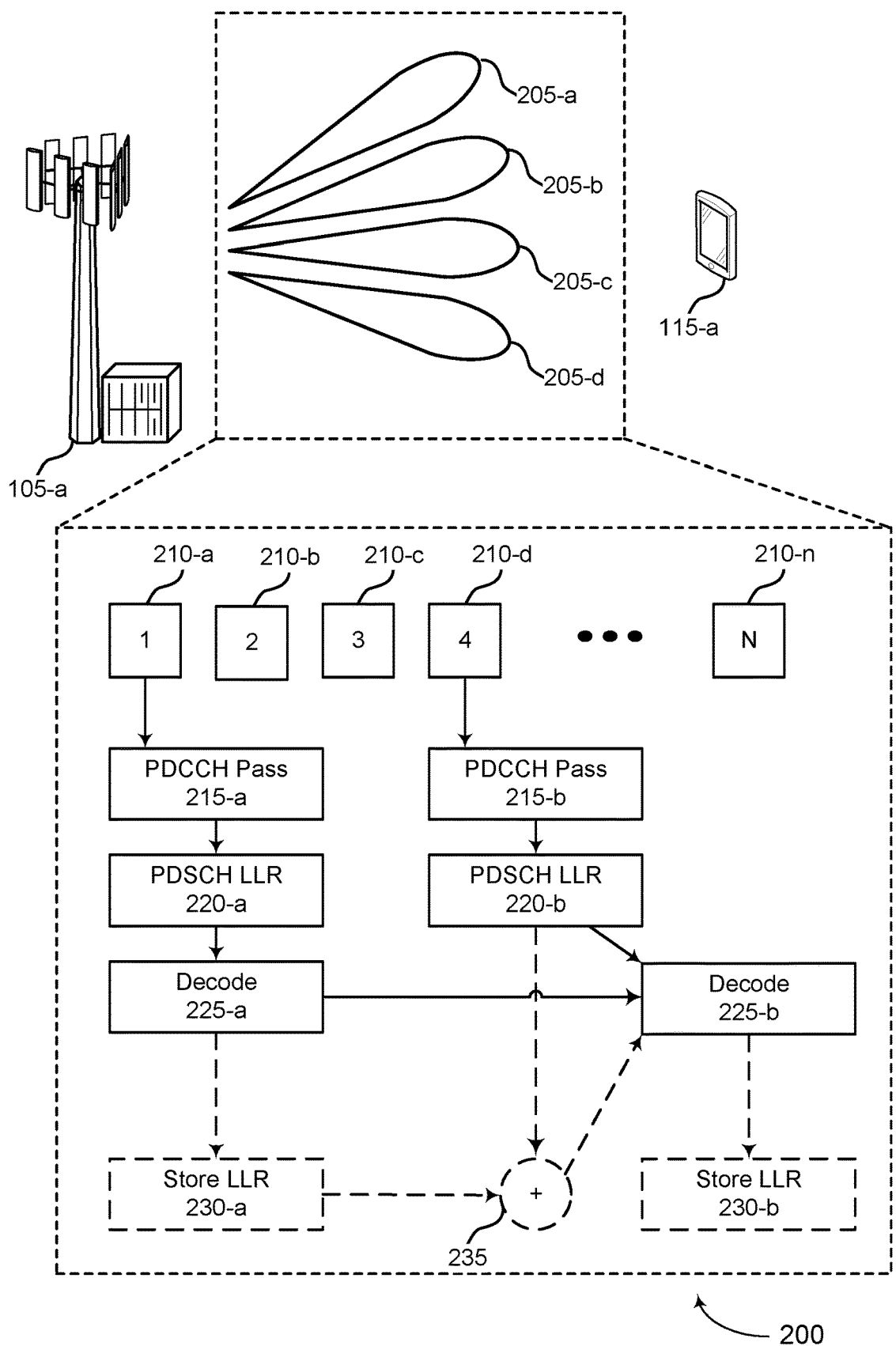
FIG. 2 shows an example of a wireless communication system that supports decoding broadcast channel signaling using multiple beams in accordance with one or more aspects of the present disclosure.

FIG. 2 shows an example of a wireless communication system 200 that supports decoding broadcast channel signaling using multiple beams in accordance with one or more aspects of the present disclosure. In some examples, aspects of the wireless communication system 200 may implement or be implemented by aspects of the wireless communication system 100. For example, the wireless communication system 200 may include a UE 115-a and a network entity 105-a, which may be examples of the corresponding devices as described with reference to FIG. 1.

The network entity 105-a and the UE 115-a may communicate using beamformed signaling. For example, the network entity 105-a may transmit to the UE 115-a using one or more beams 205. A beam 205-a, a beam 205-b, a beam 205-c, and a beam 205-d may be some of the beams of the network entity 105-a. In some examples, each of the beams 205 may point in a different direction in the spatial domain. In some examples, the UE 115-a may use beamforming to receive signaling on the beams 205. For example, the UE 115-a and/or the network entity 105-a may implement beamforming techniques for transmission and/or reception.

The network entity 105-a may transmit signaling on a broadcast channel. In some wireless communication systems, broadcast channels such as paging and/or SIBs may be transmitted on all beams with the same payload. For example, the network entity 105-a may transmit a broadcast channel signal 210 using all of the beams 205 of the network entity 105-a. The broadcast channel signal 210 may be, for example, a paging signal or a signal carrying system information, such as a SIB. A first broadcast channel signal 210-a may be transmitted using the beam 205-a, a second broadcast channel signal 210-b may be transmitted using the beam 205-b, a third broadcast channel signal 210-c may be transmitted using the beam 205-c, and a fourth broadcast channel signal 210-d may be transmitted using the beam 205-d. In some examples, each of the broadcast channel signals 210 may include a same payload. For example, the first broadcast channel signal 210-a may include the same information or payload as the second broadcast channel signal 210-b. In some examples, the first broadcast channel signal 210-a may be an example of a first instance of a broadcast channel signal 210, and the second broadcast channel signal 210-b may be an example of a second instance of the broadcast channel signal.

The network entity 105-a may transmit broadcast channel signals 210 according to a broadcast channel period. For example, the network entity 105-a may transmit the first broadcast channel signal 210-a using the beam 205-a during a first transmission occasion of the broadcast channel period. The network entity 105-a may cycle through all of the beams 205, for example, the network entity 105-a may transmit the Nth broadcast channel signal 210-n using an Nth beam. At the end of a first broadcast channel period, the network entity 105-a may begin a second broadcast channel period. For example, the network entity 105-a may start another cycle, beginning with another transmission of the first broadcast channel signal 210-a on the beam 205-a.

The wireless communication system 200 may support techniques to use multiple beams to decode a broadcast channel signal 210. For example, the UE 115-a may perform repeated decoding of broadcast channel signals 210 within a broadcast channel period. Additionally, or alternatively, the UE 115-a may store LLRs obtained from failed decoding attempts of a broadcast channel signal 210 to assist the following decoding attempt of the broadcast channel signal 210.

In some implementations, the UE 115-a may select a set of beams for the repeated decoding techniques. For example, the UE 115-a may select a set of top beams. The set of top beams may be selected based on RSRP measurements, SINR measurements, or both. In some implementations, the UE 115-a may select the top beams based on measurements for the top beams being within a threshold difference from the top beam or best beam. For example, the top beams may correspond to beams that have RSRP measurements or SINR measurements within X dB of the best beam or top beam. In some examples, the network entity 105-a may configure a value for the threshold difference. Additionally, or alternatively, the threshold difference may be configured for the wireless communication system 200 or may be configured by the UE 115-a.

In an example, the UE 115-a may select a top two beams. For example, there may be one other beam that has measurements (for example, RSRP measurements and/or SINR measurements) that are within the threshold difference from the top beam. In other implementations, the UE 115-a may select a different quantity of top beams. In some implementations, the UE 115-a may select a quantity of top beams based on a configured quantity. The UE 115-a may be configured to select a top M beams, for example, the UE 115-a uses M beams with the highest measurements to perform the repeated decoding.

The UE 115-a may attempt to decode a broadcast channel signal 210 using each beam 205 of the top beams until the UE 115-a decodes the broadcast channel signal. For example, the UE 115-a may select two top beams which correspond to the beam 205-a and the beam 205-d. The UE 115-a may monitor for broadcast channel signals 210 of the top beams during respective occasions of each of the top beams. For example, in examples in which the broadcast channel signal 210 is a paging signal, the UE 115-a may monitor a paging occasion associated with the beam 205-a for the first broadcast channel signal 210-*a*, and the UE 115-*a* may monitor a paging occasion associated with the beam 205-*d* for the fourth broadcast channel signal 210-*d*. In some examples, the UE 115-*a* may identify paging occasions for each of the top beams. The paging occasions may be ordered by time as, for example, paging occasion 1 through paging occasion N for each of N beams provided by the network entity 105-*a*. In some examples, the UE 115-*a* may decode the paging occasions of the top beams one-by-one. For example, if the UE 115-*a* decodes the broadcast channel signal at paging occasion K, the UE 115-*a* may refrain from decoding additional paging occasions. If the decoding attempt at paging occasion K fails, the UE 115-*a* may attempt to decode paging occasion K+1. In some examples, a paging occasion may refer to an occasion where a paging signal is transmitted using all beams of the network entity 105-*a*. For example, the first broadcast channel signal 210-*a* may be transmitted via a first portion of time and frequency resources of a paging occasion, and the second broadcast channel signal 210-*b* may be transmitted via a second portion of time and frequency resources of the paging occasion.

The UE 115-*a* may monitor for the first broadcast channel signal 210-*a* of the beam 205-*a*. In examples in which the UE 115-*a* detects a PDCCH candidate for the first broadcast channel signal 210-*a*, the UE 115-*a* may pass the PDCCH candidate to the decoder at 215-*a*. A demodulator at the UE 115-*a* may demodulate symbols of the first broadcast channel signal 210-*a* to obtain LLR values for information bits of the first broadcast channel signal 210-*a* at 220-*a*. The UE 115-*a* may attempt to decode the LLR values of the first broadcast channel signal 210-*a* at 225-*a*.

If a decoding attempt of the first broadcast channel signal 210-*a* is unsuccessful, the UE 115-*a* may attempt to decode the fourth broadcast channel signal 210-*d*, corresponding to the other top beam in the set of top beams. For example, the UE 115-*a* may monitor for the fourth broadcast channel signal 210-*d* of the beam 205-*d*. In examples in which the UE 115-*a* detects a PDCCH candidate for the fourth broadcast channel signal 210-*d*, the UE 115-*a* may pass the PDCCH candidate to the decoder at 215-*b*. A demodulator at the UE 115-*a* may demodulate symbols of the fourth broadcast channel signal 210-*d* to obtain LLR values for information bits of the fourth broadcast channel signal 210-*d* at 220-*b*. The UE 115-*a* may attempt to decode the LLR values of the fourth broadcast channel signal 210-*d* at 225-*b*. In some examples, some operations associated with the fourth broadcast channel signal 210-*d* may occur concurrently to some operations associated with the first broadcast channel signal 210-*a*. For example, the UE 115-*a* may be monitoring for the fourth broadcast channel signal 210-*d* while attempting to decode the first broadcast channel signal 210-*a*.

In some implementations, the UE 115-*a* may store the LLR value of a failed decoding attempt. For example, the decoding attempt at 225-*a* may fail, and the UE 115-*a* may store the LLR value from the first broadcast channel signal 210-*a* at 230-*a*. The UE 115-*a* may accumulate the LLR values associated with the first broadcast channel signal 210-*a* and the fourth broadcast channel signal 210-*d* to improve a likelihood of decoding the fourth broadcast channel signal 210-*d*. For example, at 235, the UE 115-*a* may accumulate the LLR values obtained at 220-*a* and 220-*b*. The UE 115-*a* may use the accumulated LLR values to assist decoding of the fourth broadcast channel signal 210-*d*. For example, the UE 115-*a* may perform the decoding on the accumulated LLR instead of just the LLR from the fourth broadcast channel signal 210-*d*. In examples in which the decoding attempt at 230-*b*, the UE 115-*a* may store the LLR for the first broadcast channel signal 210-*a*, the LLR for the fourth broadcast channel signal 210-*d*, or the accumulated LLR at 230-*b*.

In some examples, the UE 115-*a* may monitor for broadcast channel signals 210 based on a timing of the top beams. For example, the first broadcast channel signal 210-*a* may be transmitted before the fourth broadcast channel signal 210-*d* within the broadcast channel period. In examples in which the UE 115-*a* begins monitoring at the beginning of the broadcast channel period, the UE 115-*a* may attempt to decode the first broadcast channel signal 210-*a* before attempting to decode the fourth broadcast channel signal 210-*d*. In some implementations, the decoding attempts may or may not correspond to beam quality. For example, the beam 205-*d* may have higher measurements (for example, higher RSRP measurements and/or higher SINR measurements), but the UE 115-*a* may attempt to decode the first broadcast channel signal 210-*a* on the beam 205-*a* before attempting to decode the fourth broadcast channel signal 210-*d* on the beam 205-*d*.

In some examples, the UE 115-*a* may decode the broadcast channel signal 210 on a first attempt. For example, the UE 115-*a* may decode the first broadcast channel signal 210-*a*. In examples in which a decoding is successful, the UE 115-*a* may refrain from attempting to decode additional instances of the broadcast channel signal 210 on remaining top beams. For example, the UE 115-*a* may not attempt to decode the fourth broadcast channel signal 210-*d* on the beam 205-*d*. In some examples, decoding the broadcast channel signal 210 on a first try may be referred to as a one-shot.

Figure 3:
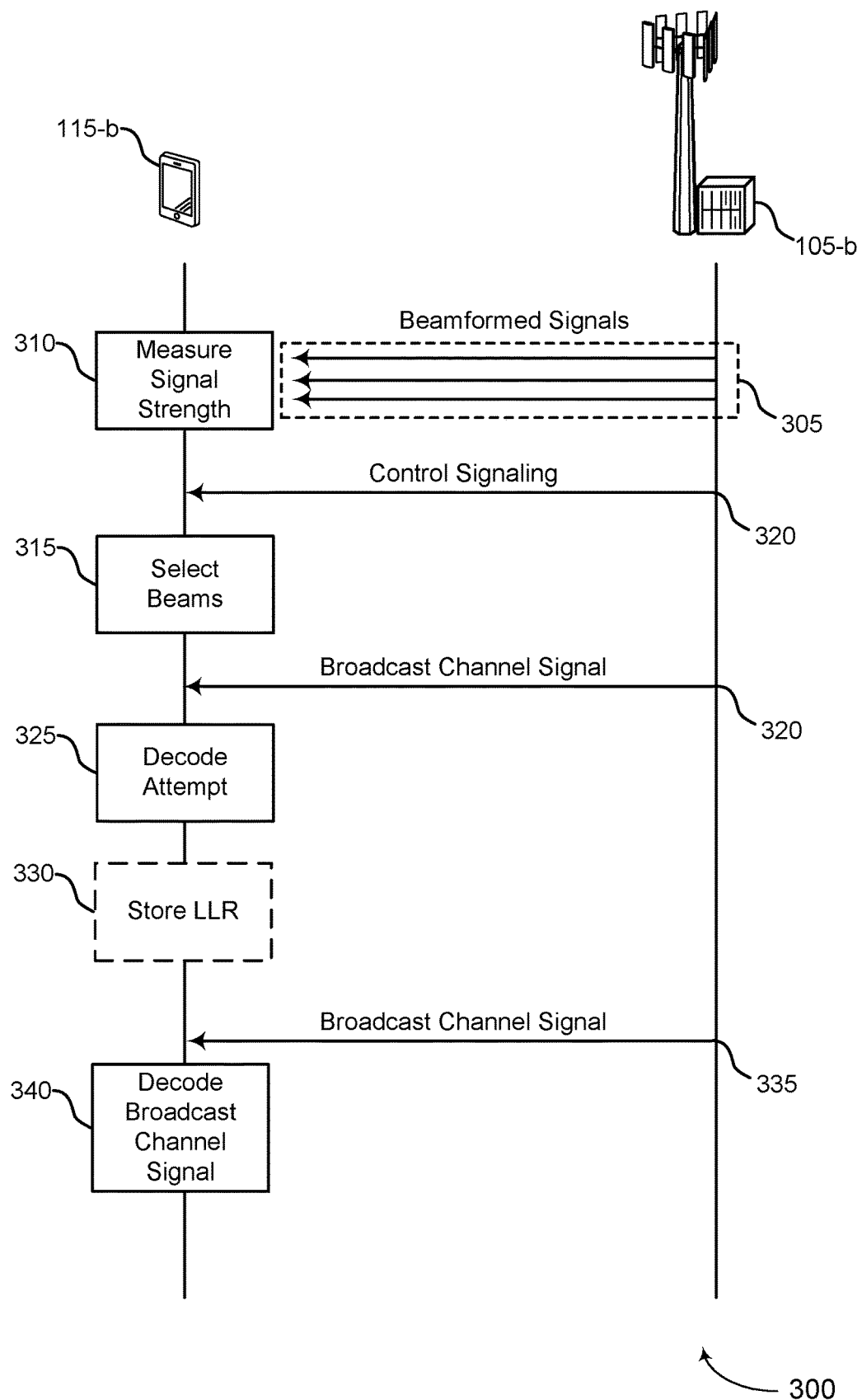
FIG. 3 shows an example of a process flow that supports decoding broadcast channel signaling using multiple beams in accordance with one or more aspects of the present disclosure.

FIG. 3 shows an example of a process flow 300 that supports decoding broadcast channel signaling using multiple beams in accordance with one or more aspects of the present disclosure. In some examples, aspects of the process flow 300 may implement or be implemented by aspects of the wireless communication system 100 or the wireless communication system 200. For example, the process flow 300 may be implemented by a UE 115-*b* and a network entity 105-*b*, which may be examples of the corresponding devices as described with reference to FIGS. 1-3.

In the following description of the process flow 300, the operations between the network entity 105-*b* and the UE 115-*b* may be performed in a different order than the example order shown. Some operations may also be omitted from the process flow 300, and other operations may be added to the process flow 300. Further, although some operations or signaling may be shown to occur at different times for discussion purposes, these operations may actually occur at the same time.

At 305, the network entity 105-*b* may transmit beamformed signals using beams of the network entity 105-*b*. At 310, the UE 115-*b* may measure a signal strength for each beam of a set of multiple beams. In some examples, the UE 115-*b* may measure the signals strength each beam of the set of multiple beams during a beam training procedure or a beam refinement procedure.

At 310, the network entity 105-*b* may receive control signaling indicating parameters or a configuration for repeated decoding or LLR combining. For example, the UE 115-*b* may receive a control signal indicting a quantity of beams for a set of top beams. Additionally, or alternatively, the UE 115-*b* may receive a control signal indicating a threshold difference for a set of top beams.

At 315, the UE 115-*b* may select a set of top beams from the set of multiple beams. For example, the UE 115-*b* may select, from the set of multiple beams, a set of two or more beams each having a respective signal strength satisfying a threshold. In some examples, a measurement for each selected beam may be within X dB of a measurement for the top beam. For example, each select beam may have an RSRP measurement and/or an SINR measurement that is no less than X dB of an RSRP measurement and/or an SINR measurement of a best beam.

At 320, the network entity 105-b may transmit a first broadcast channel signal using a first beam. In some examples, the first beam may be, temporally, a first beam in a broadcast channel period of the set of top beams. At 325, the UE 115-b may attempt to decode the first broadcast channel signal. The first broadcast channel signal may be transmitted using the first beam of the set of two or more beams. The first broadcast channel signal may be received in a single, or first, broadcast channel period. In some implementations, the first broadcast channel signal may be a first paging signal. For example, the UE 115-b may receive the first broadcast channel signal in a first paging occasion. In some implementations, the first broadcast channel signal may be a system information signal, such as a SIB.

In some examples, the decoding attempt may be unsuccessful. In some implementations, the UE 115-b may store an LLR value obtained from attempting to decode the first broadcast channel signal at 330. For example, the UE 115-b may store an LLR for the first broadcast channel signal in association with the attempt to decode the first broadcast channel signal.

At 335, the network entity 105-b may transmit a second broadcast channel signal using a second beam. In some examples, the second beam may be, temporally, a second beam in the broadcast channel period of the set of top two beams. For example, the first broadcast channel signal and the second broadcast channel signal may be transmitted in a same broadcast channel period. In some implementations, the second broadcast channel signal may be a second paging signal. For example, the UE 115-b may receive the second broadcast channel signal in a second paging occasion. In some implementations, the second broadcast channel signal may be a system information signal, such as a SIB.

At 340, the UE 115-b may attempt to decode the second broadcast channel. For example, the UE 115-b may decode, after failing to decode the first broadcast channel signal of the first beam, the second broadcast channel signal of the second beam of the set of two or more beams in the single broadcast channel period.

In some examples, the UE 115-b may decode the second broadcast channel signal in accordance with a composite LLR for multiple broadcast channel signals including the second broadcast channel signal and including one or more previous broadcast channel signals received in the single broadcast channel period including the first broadcast channel signal. For example, the UE 115-b may accumulate LLRs of previously unsuccessfully decoded broadcast channel signals and use the accumulated LLR to decode the second broadcast channel signal.

Figure 4:
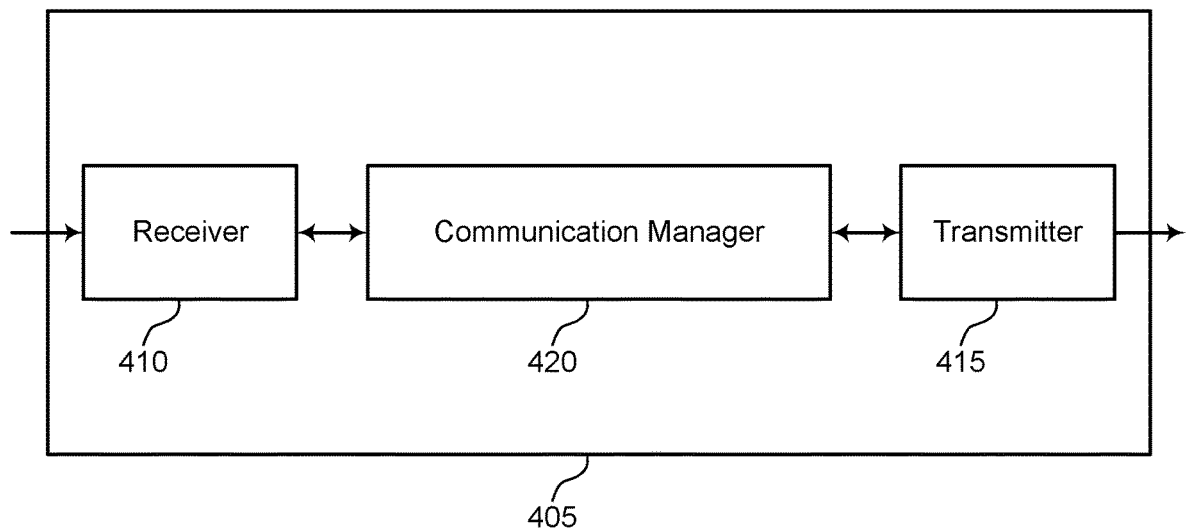
FIGS. 4 and 5 show block diagrams of devices that support decoding broadcast channel signaling using multiple beams in accordance with one or more aspects of the present disclosure.

FIG. 4 shows a block diagram of a device 405 that supports decoding broadcast channel signaling using multiple beams in accordance with one or more aspects of the present disclosure. The device 405 may be an example of aspects of a UE 115 as described herein. The device 405 may include a receiver 410, a transmitter 415, and a communication manager 420. The device 405, or one or more components of the device 405 (for example, the receiver 410, the transmitter 415, and the communication manager 420), may include at least one processor, which may be coupled with at least one memory, to, individually or collectively, support or enable the described techniques. Each of these components may be in communication with one another (for example, via one or more buses).

The receiver 410 may provide a means for receiving information such as packets, user data, control information, or any combination thereof associated with various information channels (for example, control channels, data channels, information channels related to decoding broadcast channel signaling using multiple beams). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (for example, control channels, data channels, information channels related to decoding broadcast channel signaling using multiple beams). In some examples, the transmitter 415 may be co-located with a receiver 410 in a transceiver component. The transmitter 415 may utilize a single antenna or a set of multiple antennas.

The communication manager 420, the receiver 410, the transmitter 415, or various combinations thereof or various components thereof may be examples of means for performing various aspects of decoding broadcast channel signaling using multiple beams as described herein. For example, the communication manager 420, the receiver 410, the transmitter 415, or various combinations or components thereof may be capable of performing one or more of the functions described herein.

In some examples, the communication manager 420, the receiver 410, the transmitter 415, or various combinations or components thereof may be implemented in hardware (for example, in communication management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (for example, by one or more processors, individually or collectively, executing instructions stored in the at least one memory).

Additionally, or alternatively, the communication manager 420, the receiver 410, the transmitter 415, or various combinations or components thereof may be implemented in code (for example, as communication management software or firmware) executed by at least one processor. If implemented in code executed by at least one processor, the functions of the communication manager 420, the receiver 410, the transmitter 415, or various combinations or components thereof may be performed by a general-purpose processor, a DSP, a CPU, an ASIC, an FPGA, a microcontroller, or any combination of these or other programmable logic devices (for example, configured as or otherwise supporting, individually or collectively, a means for performing the functions described in the present disclosure).

In some examples, the communication manager 420 may be configured to perform various operations (for example, receiving, obtaining, monitoring, outputting, transmitting) using or otherwise in cooperation with the receiver 410, the transmitter 415, or both. For example, the communication manager 420 may receive information from the receiver 410, send information to the transmitter 415, or be integrated in combination with the receiver 410, the transmitter 415, or both to obtain information, output information, or perform various other operations as described herein.

The communication manager 420 may support wireless communication in accordance with examples as disclosed herein. For example, the communication manager 420 is capable of, configured to, or operable to support a means for measuring a signal strength for each beam of a set of multiple beams. The communication manager 420 is capable of, configured to, or operable to support a means for selecting, from the set of multiple beams, a set of two or more beams each having a respective signal strength satisfying a threshold. The communication manager 420 is capable of, configured to, or operable to support a means for attempting to decode a first broadcast channel signal of a first beam of the set of two or more beams in a single broadcast channel period. The communication manager 420 is capable of, configured to, or operable to support a means for decoding, after failing to decode the first broadcast channel signal of the first beam, a second broadcast channel signal of a second beam of the set of two or more beams in the single broadcast channel period.

By including or configuring the communication manager 420 in accordance with examples as described herein, the device 405 (for example, at least one processor controlling or otherwise coupled with the receiver 410, the transmitter 415, the communication manager 420, or a combination thereof) may support techniques for using multiple beams to decode broadcast channel signaling in a single broadcast channel period, which may allow for reduced processing, reduced power consumption, more efficient utilization of communication resources, such as due to reducing energy spend on wake up procedures and beam training and improving a reliability of broadcast channel signaling.

Figure 5:
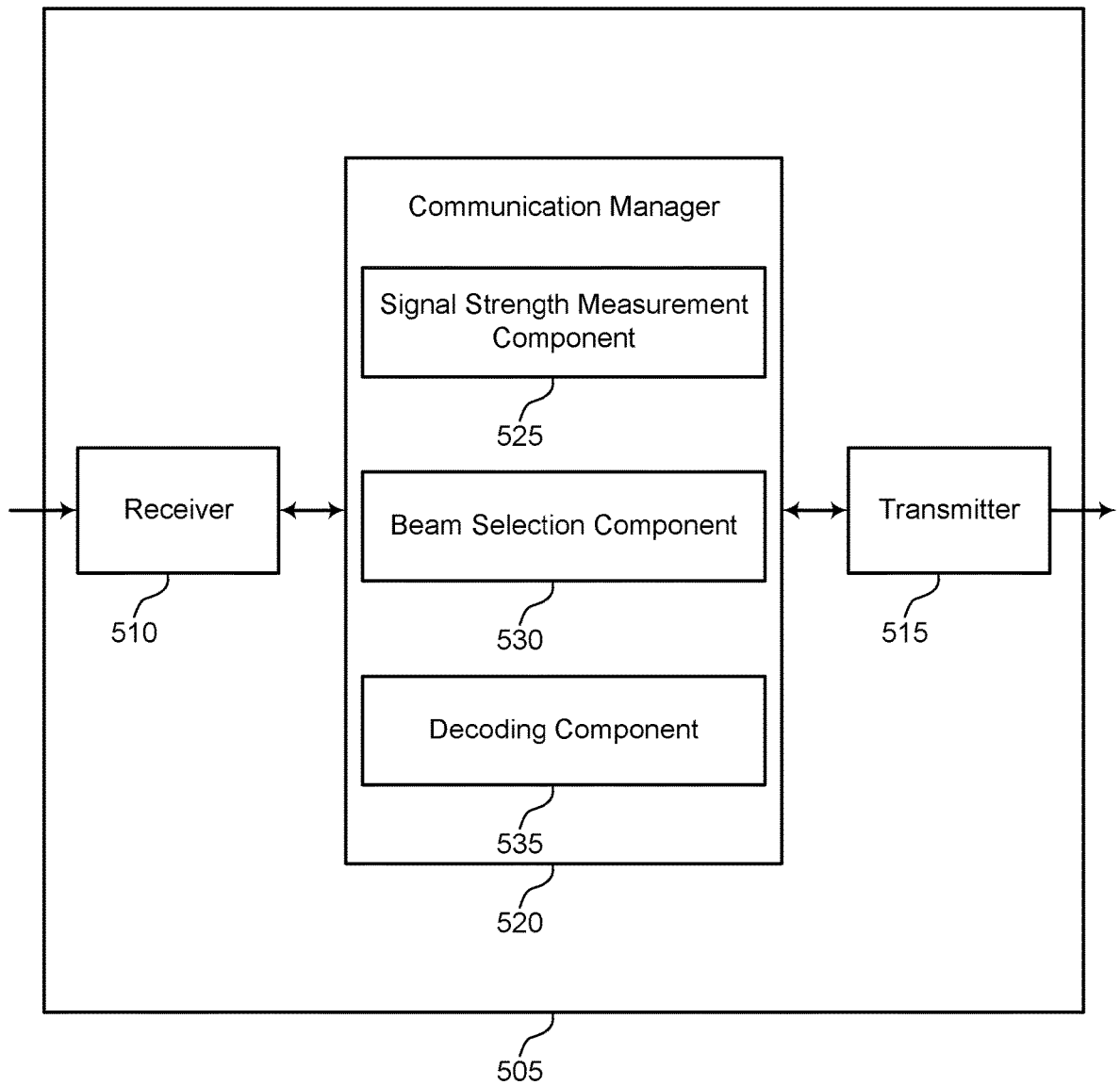

FIG. 5 shows a block diagram of a device 505 that supports decoding broadcast channel signaling using multiple beams in accordance with one or more aspects of the present disclosure. The device 505 may be an example of aspects of a device 405 or a UE 115 as described herein. The device 505 may include a receiver 510, a transmitter 515, and a communication manager 520. The device 505, or one of more components of the device 505 (for example, the receiver 510, the transmitter 515, and the communication manager 520), may include at least one processor, which may be coupled with at least one memory, to support the described techniques. Each of these components may be in communication with one another (for example, via one or more buses).

The receiver 510 may provide a means for receiving information such as packets, user data, control information, or any combination thereof associated with various information channels (for example, control channels, data channels, information channels related to decoding broadcast channel signaling using multiple beams). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (for example, control channels, data channels, information channels related to decoding broadcast channel signaling using multiple beams). In some examples, the transmitter 515 may be co-located with a receiver 510 in a transceiver component. The transmitter 515 may utilize a single antenna or a set of multiple antennas.

The device 505, or various components thereof, may be an example of means for performing various aspects of decoding broadcast channel signaling using multiple beams as described herein. For example, the communication manager 520 may include a signal strength measurement component 525, a beam selection component 530, a decoding component 535, or any combination thereof. In some examples, the communication manager 520, or various components thereof, may be configured to perform various operations (for example, receiving, obtaining, monitoring, outputting, transmitting) using or otherwise in cooperation with the receiver 510, the transmitter 515, or both. For example, the communication manager 520 may receive information from the receiver 510, send information to the transmitter 515, or be integrated in combination with the receiver 510, the transmitter 515, or both to obtain information, output information, or perform various other operations as described herein.

The communication manager 520 may support wireless communication in accordance with examples as disclosed herein. The signal strength measurement component 525 is capable of, configured to, or operable to support a means for measuring a signal strength for each beam of a set of multiple beams. The beam selection component 530 is capable of, configured to, or operable to support a means for selecting, from the set of multiple beams, a set of two or more beams each having a respective signal strength satisfying a threshold. The decoding component 535 is capable of, configured to, or operable to support a means for attempting to decode a first broadcast channel signal of a first beam of the set of two or more beams in a single broadcast channel period. The decoding component 535 is capable of, configured to, or operable to support a means for decoding, after failing to decode the first broadcast channel signal of the first beam, a second broadcast channel signal of a second beam of the set of two or more beams in the single broadcast channel period.

Figure 6:
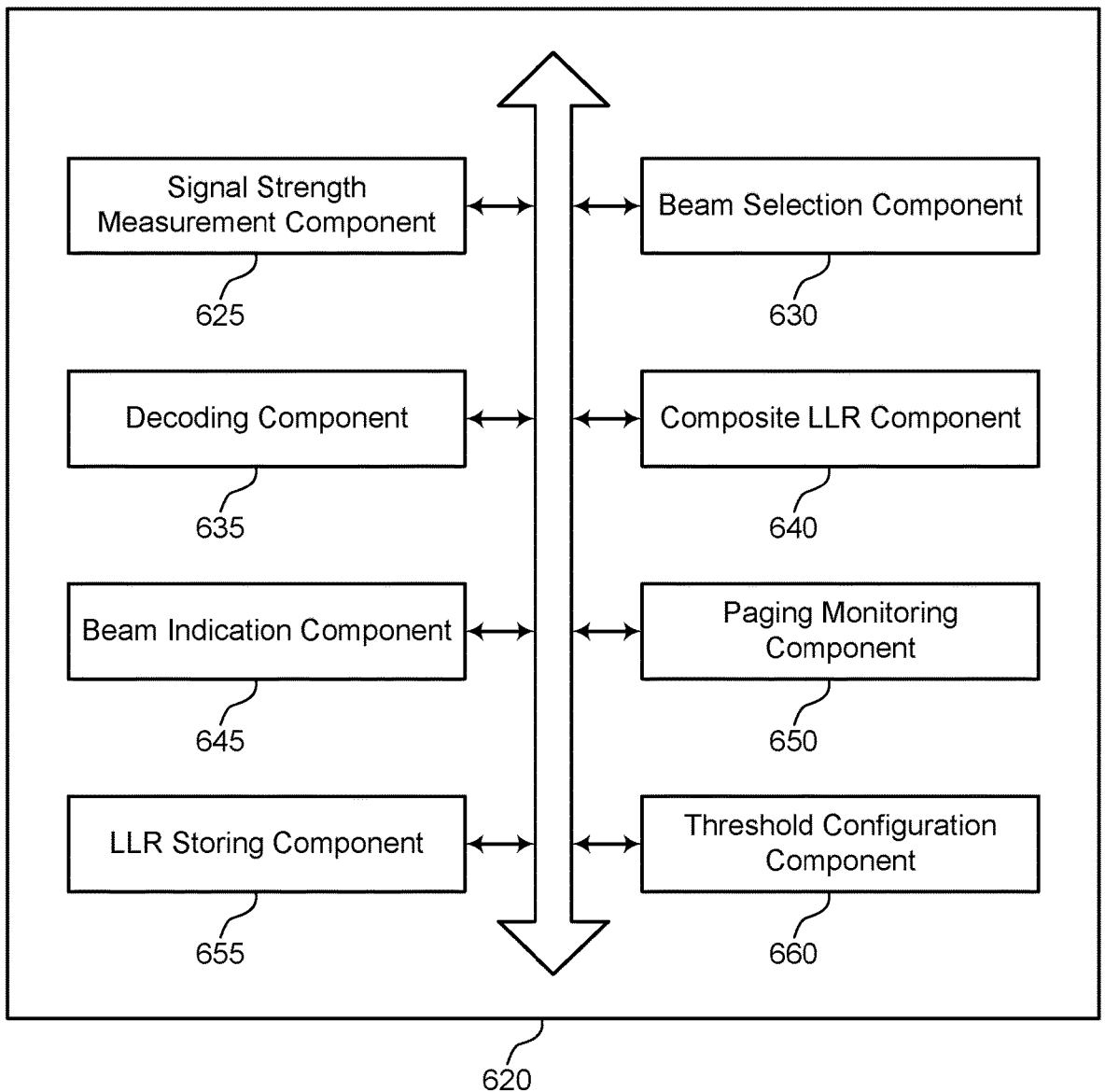
FIG. 6 shows a block diagram of a communication manager that supports decoding broadcast channel signaling using multiple beams in accordance with one or more aspects of the present disclosure.

FIG. 6 shows a block diagram of a communication manager 620 that supports decoding broadcast channel signaling using multiple beams in accordance with one or more aspects of the present disclosure. The communication manager 620, or various components thereof, may be an example of means for performing various aspects of decoding broadcast channel signaling using multiple beams as described herein. For example, the communication manager 620 may include a signal strength measurement component 625, a beam selection component 630, a decoding component 635, a composite LLR component 640, a beam indication component 645, a paging monitoring component 650, an LLR storing component 655, a threshold configuration component 660, or any combination thereof. Each of these components, or components or subcomponents thereof (for example, one or more processors, one or more memories), may communicate, directly or indirectly, with one another (for example, via one or more buses).

The communication manager 620 may support wireless communication in accordance with examples as disclosed herein. The signal strength measurement component 625 is capable of, configured to, or operable to support a means for measuring a signal strength for each beam of a set of multiple beams. The beam selection component 630 is capable of, configured to, or operable to support a means for selecting, from the set of multiple beams, a set of two or more beams each having a respective signal strength satisfying a threshold. The decoding component 635 is capable of, configured to, or operable to support a means for attempting to decode a first broadcast channel signal of a first beam of the set of two or more beams in a single broadcast channel period. In some examples, the decoding component 635 is capable of, configured to, or operable to support a means for decoding, after failing to decode the first broadcast channel signal of the first beam, a second broadcast channel signal of a second beam of the set of two or more beams in the single broadcast channel period.

In some examples, to support decoding the second broadcast channel signal, the composite LLR component 640 is capable of, configured to, or operable to support a means for decoding the second broadcast channel signal in accordance with a composite log-likelihood ratio for a set of multiple broadcast channel signals including the second broadcast channel signal and including one or more previous broadcast channel signals received in the single broadcast channel period including the first broadcast channel signal.

In some examples, to support decoding the second broadcast channel signal, the decoding component 635 is capable of, configured to, or operable to support a means for decoding the second broadcast channel signal after an attempt to decode the first broadcast channel signal, where a reception of the second broadcast channel signal is temporally after a reception of the first broadcast channel signal.

In some examples, the beam indication component 645 is capable of, configured to, or operable to support a means for receiving a control signal indicating a quantity of beams in the set of two or more beams, where decoding the second broadcast channel signal is in accordance with the indication of the quantity of beams.

In some examples, each beam of the set of two or more beams is associated with a respective signal strength measurement that is within a threshold difference from a highest signal strength measurement for a strongest beam of the set of two or more beams.

In some examples, the threshold configuration component 660 is capable of, configured to, or operable to support a means for receiving a control signal indicating the threshold difference, where decoding the first broadcast channel signal and the second broadcast channel signal is in accordance with the indication of the threshold difference.

In some examples, the paging monitoring component 650 is capable of, configured to, or operable to support a means for monitoring for the first broadcast channel signal during a paging occasion associated with the set of multiple beams, where the first broadcast channel signal is a first paging signal. In some examples, the paging monitoring component 650 is capable of, configured to, or operable to support a means for monitoring for the second broadcast channel signal during the paging occasion associated with the set of multiple beams, where the second broadcast channel signal is a second paging signal.

In some examples, the first broadcast channel signal is a first system information block, and the second broadcast channel signal is a second system information block.

In some examples, the LLR storing component 655 is capable of, configured to, or operable to support a means for storing a log-likelihood ratio for the first broadcast channel signal in association with the attempt to decode the first broadcast channel signal, where decoding the second broadcast channel signal is based on the log-likelihood ratio for the first broadcast channel signal.

In some examples, the first broadcast channel signal and the second broadcast channel signal each include a signal including same information that is communicated via the first beam and the second beam, respectively.

In some examples, the set of multiple beams are configured for Frequency Range 2.

Figure 7:
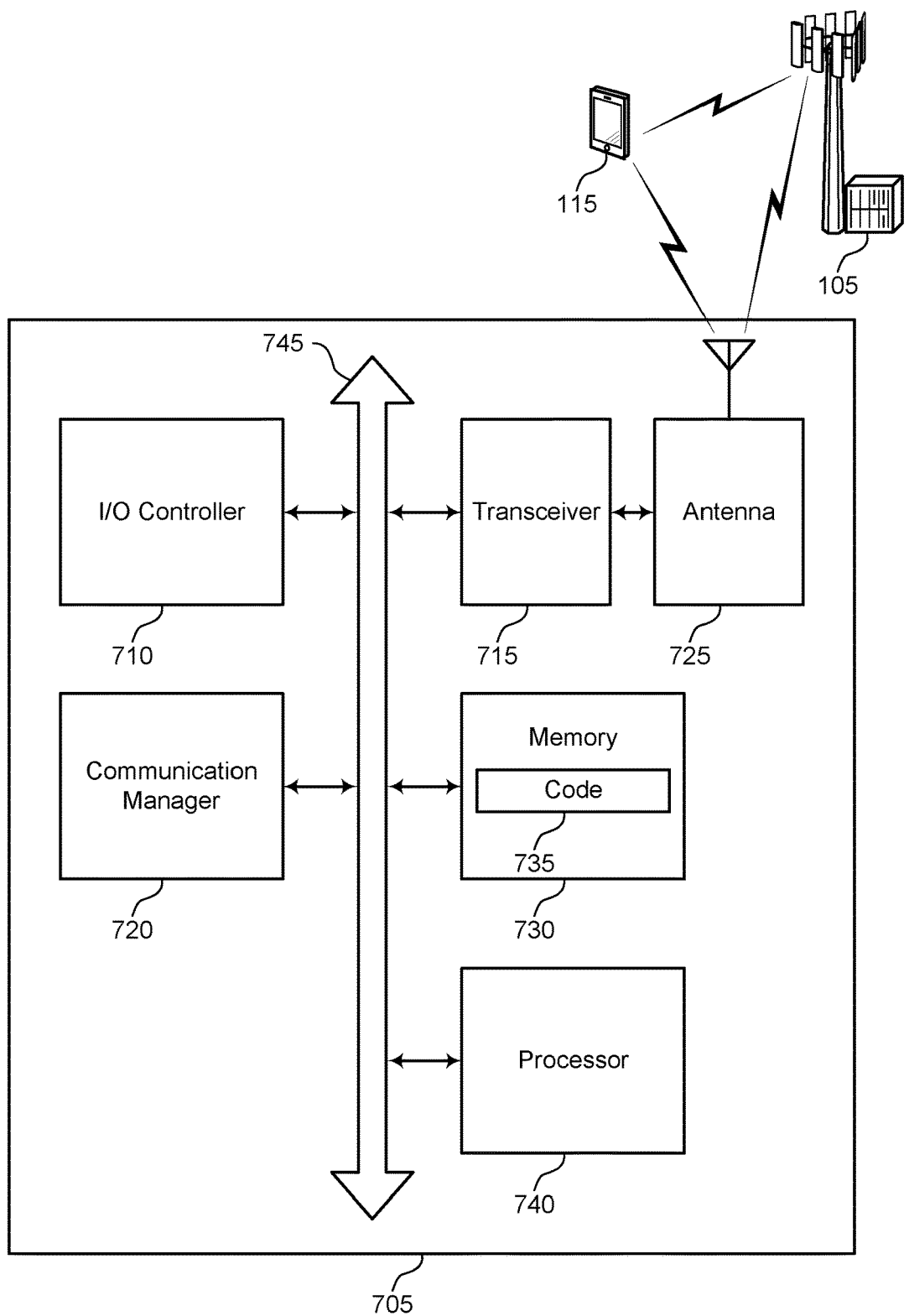
FIG. 7 shows a diagram of a system including a device that supports decoding broadcast channel signaling using multiple beams in accordance with one or more aspects of the present disclosure.

FIG. 7 shows a diagram of a system including a device 705 that supports decoding broadcast channel signaling using multiple beams in accordance with one or more aspects of the present disclosure. The device 705 may be an example of or include the components of a device 405, a device 505, or a UE 115 as described herein. The device 705 may communicate (for example, wirelessly) with one or more network entities 105, one or more UEs 115, or any combination thereof. The device 705 may include components for bi-directional voice and data communication including components for transmitting and receiving communication, such as a communication manager 720, an input/output (I/O) controller 710, a transceiver 715, an antenna 725, at least one memory 730, code 735, and at least one processor 740. These components may be in electronic communication or otherwise coupled (for example, operatively, communicatively, functionally, electronically, electrically) via one or more buses (for example, a bus 745).

The I/O controller 710 may manage input and output signals for the device 705. The I/O controller 710 may also manage peripherals not integrated into the device 705. In some examples, the I/O controller 710 may represent a physical connection or port to an external peripheral. In some examples, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some examples, the I/O controller 710 may be implemented as part of one or more processors, such as the at least one processor 740. In some examples, a user may interact with the device 705 via the I/O controller 710 or via hardware components controlled by the I/O controller 710.

In some examples, the device 705 may include a single antenna 725. However, in some other examples, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable code 735 including instructions that, when executed by the at least one processor 740, cause the device 705 to perform various functions described herein. The code 735 may be stored in a non-transitory computer-readable medium such as system memory or another type of memory. In some examples, the code 735 may not be directly executable by the at least one processor 740 but may cause a computer (for example, when compiled and executed) to perform functions described herein. In some examples, the at least one memory 730 may contain, among other things, a basic I/O system (BIOS) which may control basic hardware or software operation such as the interaction with peripheral components or devices.

The at least one processor 740 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the at least one processor 740 may be configured to operate a memory array using a memory controller. In some other cases, a memory controller may be integrated into the at least one processor 740. The at least one processor 740 may be configured to execute computer-readable instructions stored in a memory (for example, the at least one memory 730) to cause the device 705 to perform various functions (for example, functions or tasks supporting decoding broadcast channel signaling using multiple beams). For example, the device 705 or a component of the device 705 may include at least one processor 740 and at least one memory 730 coupled with or to the at least one processor 740, the at least one processor 740 and at least one memory 730 configured to perform various functions described herein. In some examples, the at least one processor 740 may include multiple processors and the at least one memory 730 may include multiple memories. One or more of the multiple processors may be coupled with one or more of the multiple memories, which may, individually or collectively, be configured to perform various functions herein.

The communication manager 720 may support wireless communication in accordance with examples as disclosed herein. For example, the communication manager 720 is capable of, configured to, or operable to support a means for measuring a signal strength for each beam of a set of multiple beams. The communication manager 720 is capable of, configured to, or operable to support a means for selecting, from the set of multiple beams, a set of two or more beams each having a respective signal strength satisfying a threshold. The communication manager 720 is capable of, configured to, or operable to support a means for attempting to decode a first broadcast channel signal of a first beam of the set of two or more beams in a single broadcast channel period. The communication manager 720 is capable of, configured to, or operable to support a means for decoding, after failing to decode the first broadcast channel signal of the first beam, a second broadcast channel signal of a second beam of the set of two or more beams in the single broadcast channel period.

By including or configuring the communication manager 720 in accordance with examples as described herein, the device 705 may support techniques for using multiple beams to decode broadcast channel signaling in a single broadcast channel period, which may allow for improved reliability of broadcast channel signaling, reduced latency, improved user experience related to reduced processing, reduced power consumption, more efficient utilization of communication resources, improved coordination between devices, longer battery life, improved utilization of processing capability.

In some examples, the communication manager 720 may be configured to perform various operations (for example, receiving, monitoring, transmitting) using or otherwise in cooperation with the transceiver 715, the one or more antennas 725, or any combination thereof. Although the communication manager 720 is illustrated as a separate component, in some examples, one or more functions described with reference to the communication manager 720 may be supported by or performed by the at least one processor 740, the at least one memory 730, the code 735, or any combination thereof. For example, the code 735 may include instructions executable by the at least one processor 740 to cause the device 705 to perform various aspects of decoding broadcast channel signaling using multiple beams as described herein, or the at least one processor 740 and the at least one memory 730 may be otherwise configured to, individually or collectively, perform or support such operations.

Figure 8:
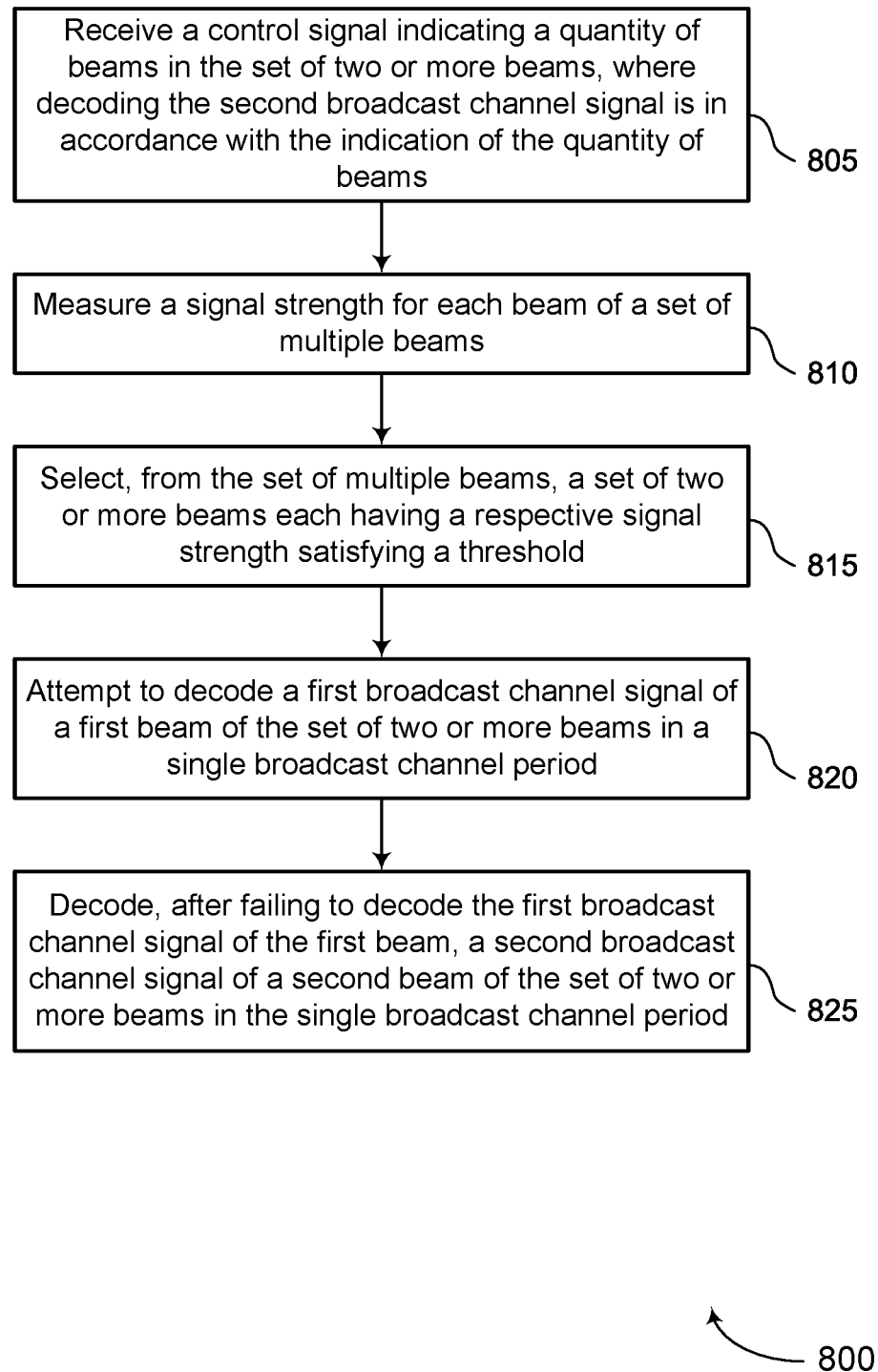
FIGS. 8 and 9 show flowcharts illustrating methods that support decoding broadcast channel signaling using multiple beams in accordance with one or more aspects of the present disclosure.

FIG. 8 shows a flowchart illustrating a method 800 that supports decoding broadcast channel signaling using multiple beams in accordance with aspects of the present disclosure. The operations of the method 800 may be implemented by a UE or its components as described herein. For example, the operations of the method 800 may be performed by a UE 115 as described with reference to FIGS. 1-7. In some examples, a UE may execute a set of instructions to control the functional elements of the UE to perform the described functions. Additionally, or alternatively, the UE may perform aspects of the described functions using special-purpose hardware.

At 805, the method may include receiving a control signal indicating a quantity of beams in the set of two or more beams, where decoding the second broadcast channel signal is in accordance with the indication of the quantity of beams. The operations of block 805 may be performed in accordance with examples as disclosed herein. In some examples, aspects of the operations of 805 may be performed by a beam indication component 645 as described with reference to FIG. 6.

At 810, the method may include measuring a signal strength for each beam of a set of multiple beams. The operations of block 810 may be performed in accordance with examples as disclosed herein. In some examples, aspects of the operations of 810 may be performed by a signal strength measurement component 625 as described with reference to FIG. 6.

At 815, the method may include selecting, from the set of multiple beams, a set of two or more beams each having a respective signal strength satisfying a threshold. The operations of block 815 may be performed in accordance with examples as disclosed herein. In some examples, aspects of the operations of 815 may be performed by a beam selection component 630 as described with reference to FIG. 6.

At 820, the method may include attempting to decode a first broadcast channel signal of a first beam of the set of two or more beams in a single broadcast channel period. The operations of block 820 may be performed in accordance with examples as disclosed herein. In some examples, aspects of the operations of 820 may be performed by a decoding component 635 as described with reference to FIG. 6.

At 825, the method may include decoding, after failing to decode the first broadcast channel signal of the first beam, a second broadcast channel signal of a second beam of the set of two or more beams in the single broadcast channel period. The operations of block 825 may be performed in accordance with examples as disclosed herein. In some examples, aspects of the operations of 825 may be performed by a decoding component 635 as described with reference to FIG. 6.

Figure 9:
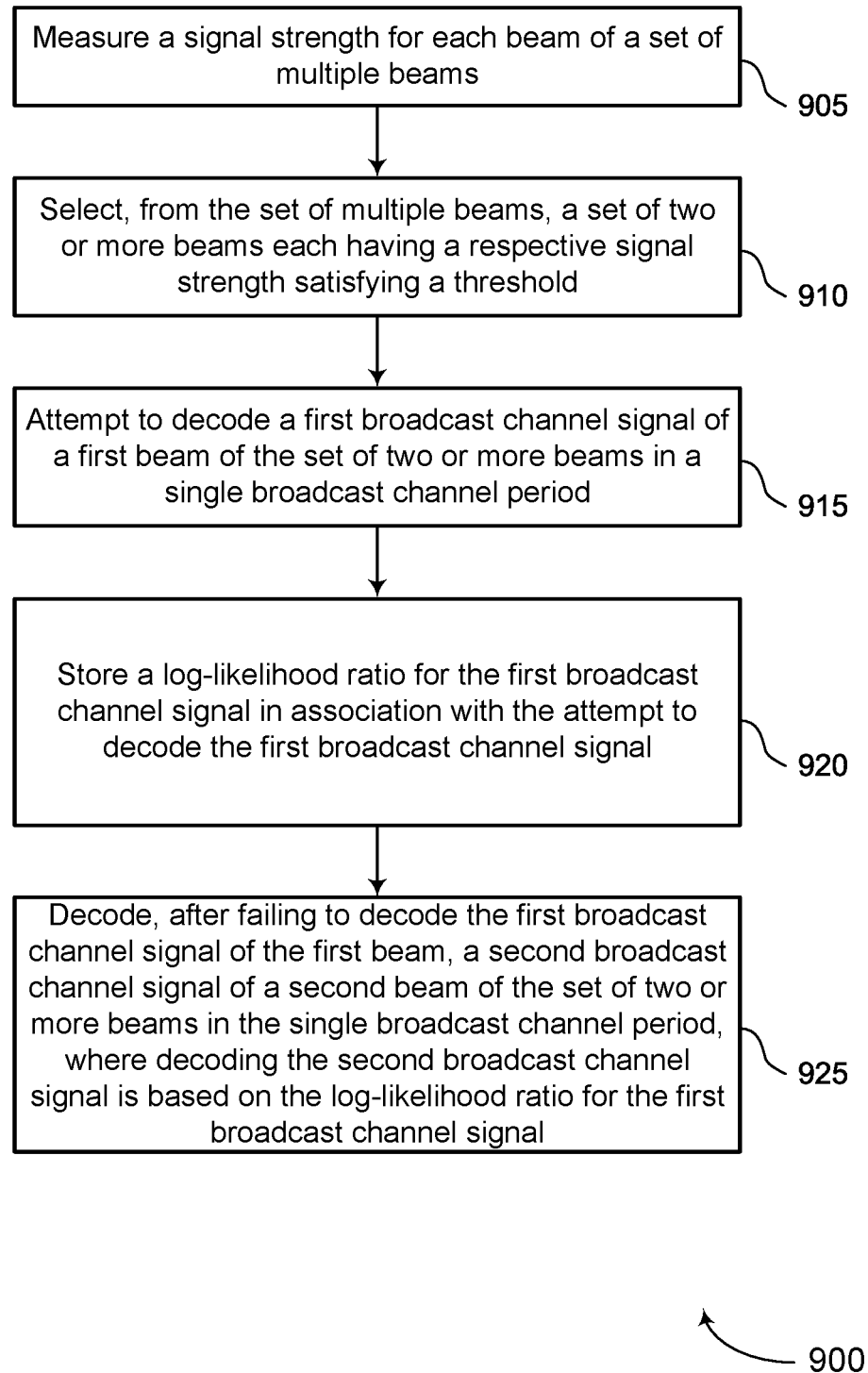

FIG. 9 shows a flowchart illustrating a method 900 that supports decoding broadcast channel signaling using multiple beams in accordance with aspects of the present disclosure. The operations of the method 900 may be implemented by a UE or its components as described herein. For example, the operations of the method 900 may be performed by a UE 115 as described with reference to FIGS. 1-7. In some examples, a UE may execute a set of instructions to control the functional elements of the UE to perform the described functions. Additionally, or alternatively, the UE may perform aspects of the described functions using special-purpose hardware.

At 905, the method may include measuring a signal strength for each beam of a set of multiple beams. The operations of block 905 may be performed in accordance with examples as disclosed herein. In some examples, aspects of the operations of 905 may be performed by a signal strength measurement component 625 as described with reference to FIG. 6.

At 910, the method may include selecting, from the set of multiple beams, a set of two or more beams each having a respective signal strength satisfying a threshold. The operations of block 910 may be performed in accordance with examples as disclosed herein. In some examples, aspects of the operations of 910 may be performed by a beam selection component 630 as described with reference to FIG. 6.

At 915, the method may include attempting to decode a first broadcast channel signal of a first beam of the set of two or more beams in a single broadcast channel period. The operations of block 915 may be performed in accordance with examples as disclosed herein. In some examples, aspects of the operations of 915 may be performed by a decoding component 635 as described with reference to FIG. 6.

At 920, the method may include storing a log-likelihood ratio for the first broadcast channel signal in association with the attempt to decode the first broadcast channel signal. The operations of block 920 may be performed in accordance with examples as disclosed herein. In some examples, aspects of the operations of 920 may be performed by an LLR storing component 655 as described with reference to FIG. 6.

At 925, the method may include decoding, after failing to decode the first broadcast channel signal of the first beam, a second broadcast channel signal of a second beam of the set of two or more beams in the single broadcast channel period, where decoding the second broadcast channel signal is based on the log-likelihood ratio for the first broadcast channel signal. For example, the method may include decoding the second broadcast channel signal after combining the LLR for the first broadcast channel signal with an LLR for the second broadcast channel signal. The operations of block 925 may be performed in accordance with examples as disclosed herein. In some examples, aspects of the operations of 925 may be performed by a decoding component 635 as described with reference to FIG. 6.

The following provides an overview of aspects of the present disclosure:

Aspect 1: A method for wireless communication by a UE, comprising: measuring a signal strength for each beam of a plurality of beams; selecting, from the plurality of beams, a set of two or more beams each having a respective signal strength satisfying a threshold; attempting to decode a first broadcast channel signal of a first beam of the set of two or more beams in a single broadcast channel period; and decoding, after failing to decode the first broadcast channel signal of the first beam, a second broadcast channel signal of a second beam of the set of two or more beams in the single broadcast channel period.

Aspect 2: The method of aspect 1, wherein decoding the second broadcast channel signal comprises: decoding the second broadcast channel signal in accordance with a composite log-likelihood ratio for a plurality of broadcast channel signals including the second broadcast channel signal and including one or more previous broadcast channel signals received in the single broadcast channel period including the first broadcast channel signal.

Aspect 3: The method of any of aspects 1 through 2, wherein decoding the second broadcast channel signal comprises: decoding the second broadcast channel signal after an attempt to decode the first broadcast channel signal, wherein a reception of the second broadcast channel signal is temporally after a reception of the first broadcast channel signal.

Aspect 4: The method of any of aspects 1 through 3, further comprising: receiving a control signal indicating a quantity of beams in the set of two or more beams, wherein decoding the second broadcast channel signal is in accordance with the indication of the quantity of beams.

Aspect 5: The method of any of aspects 1 through 4, wherein each beam of the set of two or more beams is associated with a respective signal strength measurement that is within a threshold difference from a highest signal strength measurement for a strongest beam of the set of two or more beams.

Aspect 6: The method of aspect 5, further comprising: receiving a control signal indicating the threshold difference, wherein decoding the first broadcast channel signal and the second broadcast channel signal is in accordance with the indication of the threshold difference.

Aspect 7: The method of any of aspects 1 through 6, further comprising: monitoring for the first broadcast channel signal during a paging occasion associated with the plurality of beams, wherein the first broadcast channel signal is a first paging signal; and monitoring for the second broadcast channel signal during a second paging occasion associated with the plurality of beams, wherein the second broadcast channel signal is a second paging signal.

Aspect 8: The method of any of aspects 1 through 7, wherein the first broadcast channel signal is a first system information block, and the second broadcast channel signal is a second system information block.

Aspect 9: The method of any of aspects 1 through 8, further comprising: storing a log-likelihood ratio for the first broadcast channel signal in association with the attempt to decode the first broadcast channel signal, wherein decoding the second broadcast channel signal is based at least in part on the log-likelihood ratio for the first broadcast channel signal.

Aspect 10: The method of any of aspects 1 through 9, wherein the first broadcast channel signal and the second broadcast channel signal each include a signal comprising same information that is communicated via the first beam and the second beam, respectively.

Aspect 11: The method of any of aspects 1 through 10, wherein the plurality of beams are configured for Frequency Range 2.

Aspect 12: A UE for wireless communication, a processing system that includes processor circuitry and memory circuitry that stores code, the processing system configured to cause the UE to perform a method of any of aspects 1 through 11.

Aspect 13: A UE for wireless communication, comprising at least one means for performing a method of any of aspects 1 through 11.

Aspect 14: A non-transitory computer-readable medium storing code for wireless communication, the code comprising instructions executable by at least one processor to perform a method of any of aspects 1 through 11.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communication systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (for example, receiving information), accessing (for example, accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
a processing system that includes processor circuitry and memory circuitry that stores code, the processing system configured to cause the UE to:
measure a signal strength for each beam of a plurality of beams;
select, from the plurality of beams, a set of two or more beams each having a respective signal strength satisfying a threshold;
attempt to decode a first broadcast channel signal of a first beam of the set of two or more beams in a single broadcast channel period; and
decode, after failing to decode the first broadcast channel signal of the first beam and based at least in part on a second broadcast channel signal being received temporally after the first broadcast channel signal, the second broadcast channel signal of a second beam of the set of two or more beams in the single broadcast channel period.

2. The UE of claim 1, wherein, to decode the second broadcast channel signal, the processing system is configured to cause the UE to decode the second broadcast channel signal in accordance with a composite log-likelihood ratio for a plurality of broadcast channel signals including the second broadcast channel signal and including one or more previous broadcast channel signals received in the single broadcast channel period including the first broadcast channel signal.

3. The UE of claim 1, wherein the processing system is configured to cause the UE to receive a control signal indicating a quantity of beams in the set of two or more beams, wherein decoding the second broadcast channel signal is in accordance with the indication of the quantity of beams.

4. The UE of claim 1, wherein each beam of the set of two or more beams is associated with a respective signal strength measurement that is within a threshold difference from a highest signal strength measurement for a strongest beam of the set of two or more beams.

5. The UE of claim 4, wherein the processing system is configured to cause the UE to receive a control signal indicating the threshold difference, wherein decoding the first broadcast channel signal and the second broadcast channel signal is in accordance with the indication of the threshold difference.

6. The UE of claim 1, wherein the processing system is configured to cause the UE to:
monitor for the first broadcast channel signal during a paging occasion associated with the plurality of beams, wherein the first broadcast channel signal is a first paging signal; and
monitor for the second broadcast channel signal during the paging occasion associated with the plurality of beams, wherein the second broadcast channel signal is a second paging signal.

7. The UE of claim 1, wherein the first broadcast channel signal is a first system information block, and the second broadcast channel signal is a second system information block.

8. The UE of claim 1, wherein the processing system is configured to cause the UE to store a log-likelihood ratio for the first broadcast channel signal in association with the attempt to decode the first broadcast channel signal, wherein decoding the second broadcast channel signal is based at least in part on the log-likelihood ratio for the first broadcast channel signal.

9. The UE of claim 1, wherein the first broadcast channel signal and the second broadcast channel signal each include a signal comprising same information that is communicated via the first beam and the second beam, respectively.

10. The UE of claim 1, wherein the plurality of beams are configured for Frequency Range 2.

11. A method for wireless communication by a user equipment (UE), comprising:
measuring a signal strength for each beam of a plurality of beams;

selecting, from the plurality of beams, a set of two or more beams each having a respective signal strength satisfying a threshold;

attempting to decode a first broadcast channel signal of a first beam of the set of two or more beams in a single broadcast channel period; and decoding, after failing to decode the first broadcast channel signal of the first beam and based at least in part on a second broadcast channel signal being received temporally after the first broadcast channel signal, the second broadcast channel signal of a second beam of the set of two or more beams in the single broadcast channel period.

12. The method of claim 11, wherein decoding the second broadcast channel signal comprises decoding the second broadcast channel signal in accordance with a composite log-likelihood ratio for a plurality of broadcast channel signals including the second broadcast channel signal and including one or more previous broadcast channel signals received in the single broadcast channel period including the first broadcast channel signal.

13. The method of claim 11, further comprising receiving a control signal indicating a quantity of beams in the set of two or more beams, wherein decoding the second broadcast channel signal is in accordance with the indication of the quantity of beams.

14. The method of claim 11, wherein each beam of the set of two or more beams is associated with a respective signal strength measurement that is within a threshold difference from a highest signal strength measurement for a strongest beam of the set of two or more beams.

15. The method of claim 14, further comprising receiving a control signal indicating the threshold difference, wherein decoding the first broadcast channel signal and the second broadcast channel signal is in accordance with the indication of the threshold difference.

16. The method of claim 11, further comprising:

monitoring for the first broadcast channel signal during a paging occasion associated with the plurality of beams, wherein the first broadcast channel signal is a first paging signal; and monitoring for the second broadcast channel signal during the paging occasion associated with the plurality of beams, wherein the second broadcast channel signal is a second paging signal.

17. The method of claim 11, wherein the first broadcast channel signal is a first system information block, and the second broadcast channel signal is a second system information block.

18. The method of claim 11, further comprising storing a log-likelihood ratio for the first broadcast channel signal in association with the attempt to decode the first broadcast channel signal, wherein decoding the second broadcast channel signal is based at least in part on the log-likelihood ratio for the first broadcast channel signal.

19. The method of claim 11, wherein the first broadcast channel signal and the second broadcast channel signal each include a signal comprising same information that is communicated via the first beam and the second beam, respectively.

20. The method of claim 11, wherein the plurality of beams are configured for Frequency Range 2.

* * * * *